United States Patent [19]

Scanland

[11] 4,172,351
[45] Oct. 30, 1979

[54] SAFETY SHIELD CONSTRUCTION FOR ROTARY MOWER

[75] Inventor: Joseph E. Scanland, Savannah, Ga.
[73] Assignee: Roper Corporation, Kankakee, Ill.
[21] Appl. No.: 918,960
[22] Filed: Jun. 26, 1978
[51] Int. Cl.² ............................................. A01D 67/00
[52] U.S. Cl. .................................. 56/320.1; 56/17.4; 56/255
[58] Field of Search ................... 56/320.1, 320.2, 17.4, 56/17.5, 255

[56] References Cited

U.S. PATENT DOCUMENTS

| 2,977,739 | 4/1961 | Lustyan | 56/320.2 |
| 3,501,902 | 3/1970 | Dahl et al. | 56/17.4 |
| 3,537,720 | 11/1970 | Irgens | 280/43 |

FOREIGN PATENT DOCUMENTS 96260 6/1963 Denmark ................................ 56/320.1

Primary Examiner—Russell R. Kinsey
Attorney, Agent, or Firm—Leydig, Voit, Osann, Mayer & Holt, Ltd.

[57] ABSTRACT

A rotary lawn mower of the type having a circular housing with adjustably mounted ground engaging wheels. A side shield is provided in the form of a vertical plate of metal arranged fore-and-aft between the wheels and closely alongside the housing. The shield is supported at its ends on the front and rear axles, extending close to the ground to prevent ejection of a missile at ground level and of sufficient height to prevent discharge at a higher level in all positions of housing adjustment. Preferably the housing has a laterally extending horizontal apron along its lower edge while the side shield has a pair of inwardly extending tabs along its upper edge in overlapping relation to the ends of the apron to prevent ejection of a missile upwardly in the space adjacent the wheel treads. As an alternate construction, the shield has an inwardly extending ledge which conforms to the wall of the mower housing.

7 Claims, 8 Drawing Figures

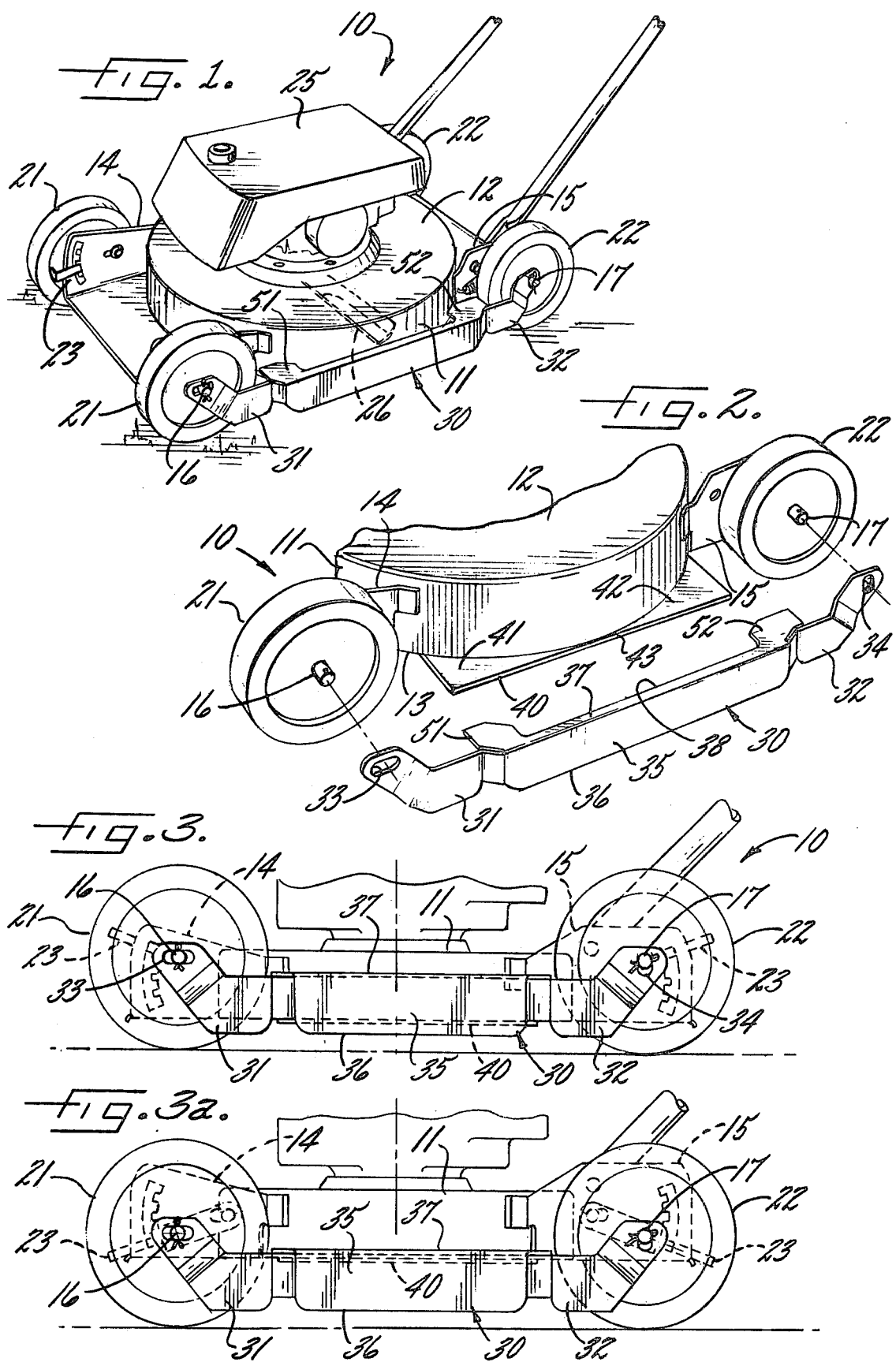

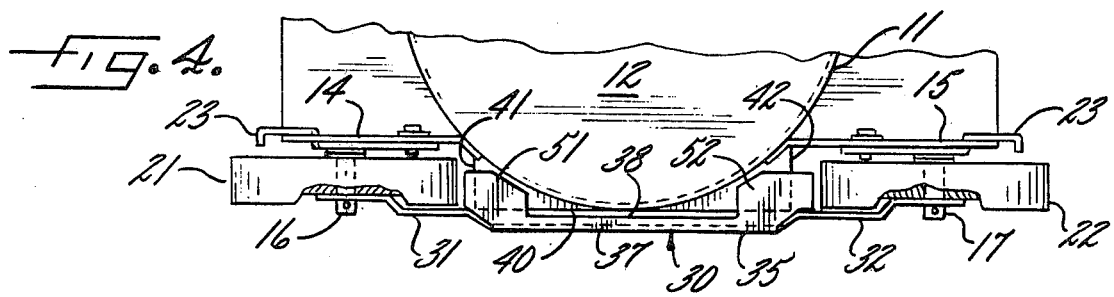
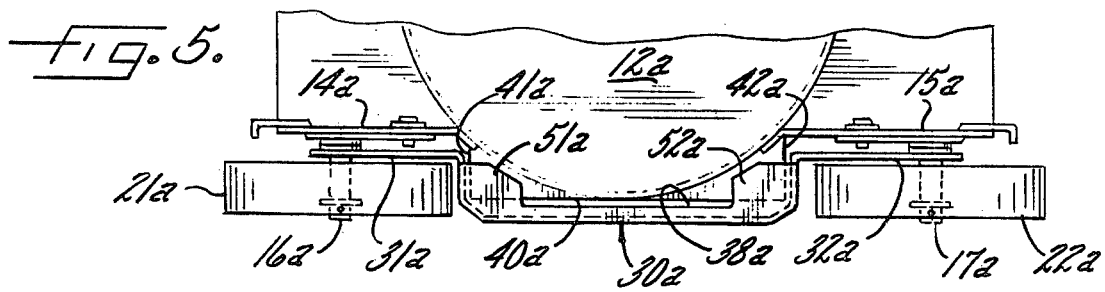
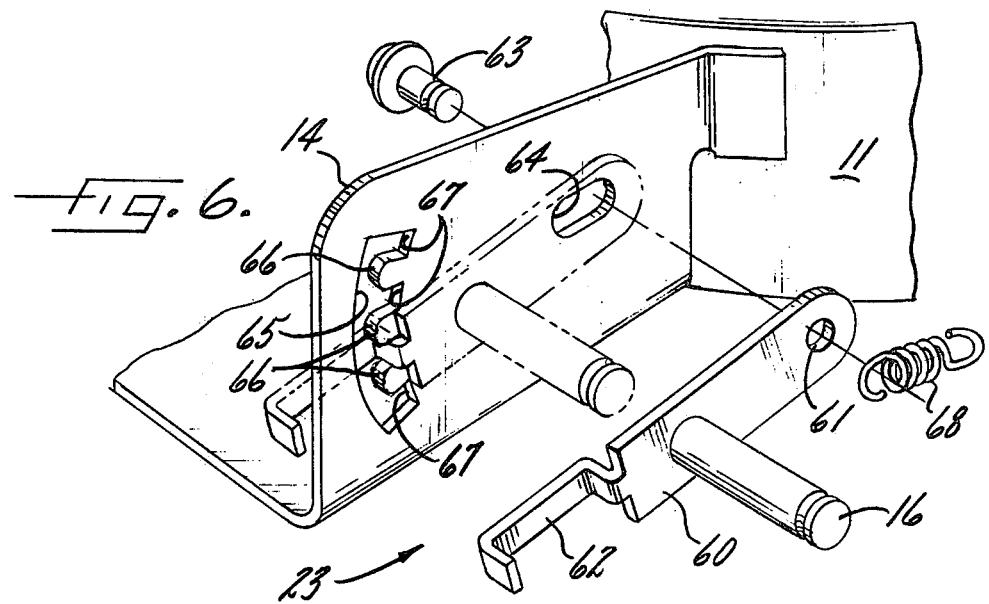
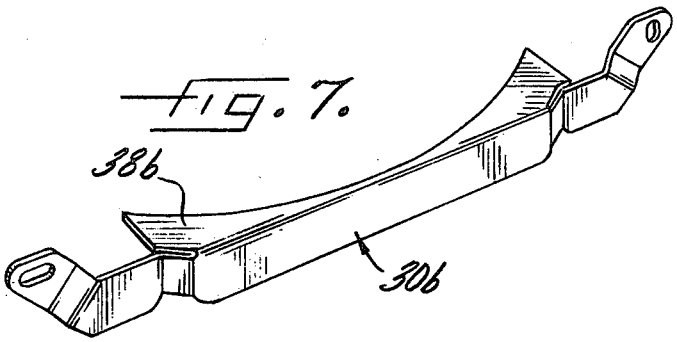

SAFETY SHIELD CONSTRUCTION FOR ROTARY MOWER

It is known to provide a set of discs rolling along the ground alongside of a rotary mower to prevent ejection of missiles from the blade as shown in Dahl et al. U.S. Pat. No. 3,501,902. In this patent the discs are floatingly mounted so that each disc maintains contact with the ground as the mower passes over rough terrain. The discs and special mounting therefore require numerous individually movable parts which are not only expensive but which are, in addition, subject to frictional problems resulting in malfunction and an increase in the power required to move the mower along the ground. Bundy U.S. Pat. No. 2,929,186 shows use of a thin bar encircling a rotary mower, and secured to the wheel axles thereof, for preventing the foot of the operator from coming in contact with the blade.

Danish Pat. No. 96,260 shows use of a metal plate rigidly secured to the wheel axles in a position alongside the mower housing intended primarily to prevent scalping of humps by the blade. While the plate would inherently act to prevent discharge of missiles at ground level, there is no provision for preventing discharge of missiles upwardly in the space adjacent the wheels and, moreover, the attachment acts to lift the wheels of the mower from the ground, which is undesirable.

It is, accordingly, an object of the present invention to provide, in a mower having wheel adjustment for determining the riding height of the housing, a side shield construction which prevents discharge of a missile either at or above ground level even when the mower housing is riding in its high position. It is a related object to provide a mower including a side shield construction which prevents discharge of missiles and which may be used on rough terrain without necessity for the mower wheels to leave the ground.

It is an object of the invention in one of its aspects to provide a side shield construction which, in addition to a main vertical portion, has horizontal portions which cooperate with a horizontal apron on the housing to prevent upward discharge of missiles in the heretofore unprotected space adjacent the wheel treads.

It is a general object of the invention to provide a side shield construction which is simple and economical and which can be readily applied to existing designs of rotary mowers without substantial modification.

Other objects and advantages of the invention will become apparent upon reading the attached detailed description and upon reference to the drawings in which:

FIG. 1 is a perspective view of a mower constructed in accordance with the present invention.

FIG. 2 is a fragmentary exploded perspective view of a portion of the device shown in FIG. 1.

FIG. 3 is a side elevation with the housing adjusted to low position.

FIG. 3a is a partial side view, similar to FIG. 3, but with the housing in its high position.

FIG. 4 is a fragmentary top view corresponding to FIG. 3.

FIG. 5 is a view similar to FIG. 4 but showing an alternative embodiment.

FIG. 6 is an exploded view on an enlarged scale of the wheel adjusting mechanism.

FIG. 7 shows in perspective, a side shield having a continuous ledge following the curvature of the housing.

While the invention has been described in connection with certain preferred embodiments, it will be understood that I do not intend to be limited to the particular embodiments shown but intend, on the contrary, to cover the various alternative and equivalent constructions included within the spirit and scope of the appended claims.

Turning now to FIG. 1 there is shown a mower 10 having a flat cylindrical housing 11 with a top surface 12 and lower edge 13. The housing has forwardly and rearwardly extending brackets 14, 15, supporting axles 16, 17 on which are mounted front and rear wheels 21, 22. Each wheel has a vertical adjusting mechanism 23 for adjusting its position relative to the housing and to which more detailed reference will be made. Mounted on the top surface 12 of the housing is an engine 25 driving a rotary blade 26.

In accordance with the present invention a side shield is provided in the form of a vertical plate extending fore-and-aft alongside of the housing and adjacent the wheels, the shield being supported at its ends on the front and rear axles and extending close to the ground to prevent discharge of a missile at ground level, the plate having sufficient vertical height so that discharge of a missile above ground level is also prevented even when the mower housing is riding in its high position. Thus, referring to FIGS. 1–4, a side shield, indicated at 30, is provided having front and rear ends 31, 32 formed with openings 33, 34 which are telescoped over the ends of the front and rear axles 16, 17. The side shield has a vertical wall 35, with lower and upper parallel edges 36, 37. The side shield preferably has a straight central portion with a straight horizontal ledge 38 providing lateral reinforcement.

In accordance with one of the aspects of the invention, a lost motion connection is employed at at least one of the axles for enabling lost motion both in the horizontal and vertical directions. This is preferably accomplished by making the opening 33 at the front end of the side shield in the form of a horizontally elongated slot and by making the opening 34 at the rear end vertically elongated. The horizontal elongation accommodates minor differences in the center-to-center distance between the axles. The vertical elongation permits the side shield to float in the vertical direction, thereby enabling all four wheels of the mower to remain in contact with the ground in the event that the side shield strikes a hump or other obstruction.

By supporting the side shield directly upon the wheel axles it rides at a constant low level with respect to the ground, thereby preventing ejection of a missile at ground level. Ground level for present purposes is defined as the level below the tips of the cut grass, it being understood that any small missile which is ejected below grass tip level has its energy promptly dissipated and thus does not present a safety hazard. The relationship between the side shield and the ground remains unchanged even when the housing is relatively adjusted to its uppermost riding level illustrated in FIG. 3a.

In carrying out the invention the side shield has a vertical height which is substantially greater than the vertical throw of the associated wheel adjusting mechanism thereby to inhibit the discharge of a missile above ground level including discharge above the side shield itself.

Moreover, in accordance with one of the aspects of the present invention the housing is provided with a laterally extending horizontal apron along its lower edge and spanning at least a portion of the distance between the wheels, the apron having an outer edge which extends closely parallel to the side shield to inhibit ejection of missiles above the side shield in all positions of relative adjustment of the housing. Turning to FIG. 2 a laterally extending apron, indicated at 40, integrally joined at the lower edge 13 of the housing, has a forward end 41, a rear end 42 and an outer edge 43. It is apparent from the fragmentary top view, FIG. 4, that the edge 43 closely parallels the side shield to prevent escape of a missile therebetween while nevertheless having sufficient clearance so that the side shield floats freely and does not brush against the apron.

It is one of the further features of the invention that the escape passages adjacent the treads of the front and rear wheels, usually a region of vulnerability, are also effectively blocked. Thus I provide on the side shield a pair of inwardly extending tabs along the upper edge 37, the tabs being respectively positioned closely adjacent the wheel treads and in overlapping relation to the ends of the apron to prevent ejection of missiles upwardly adjacent the wheels. Such tabs, indicated at 51, 52 in the drawings, are preferably integrally formed, being bent horizontally inwardly at the upper edge 37 of the shield 30.

In summary, it will be apparent that a missile cannot be dangerously ejected by the rotary blade below the shield 30 by reason of its riding at a constant low height above the ground, or above the shield by reason of a combination of the height of the guide, the presence of the horizontal apron 40, and the presence of the inwardly extending tabs 51, 52 which overlap the apron and which effectively block the escape passages normally existing adjacent the wheel treads.

While the invention has been described in connection with a side shield having brackets adjacent the outside surfaces of the wheels, the invention is not limited thereto and, if desired, the brackets 31, 32 may have inwardly offset end portions to engage the axles adjacent the inside surfaces of the wheels. This is illustrated in FIG. 5 in which corresponding reference numerals have been applied to corresponding elements with addition of subscript a.

Simply for the sake of completeness reference may be made to a typical adjusting mechanism 23 which may be interposed between each of the wheels and its supporting bracket. Referring to FIG. 6 the adjusting mechanism associated with the left front wheel 21 is illustrated in exploded form. Here the wheel axle 16 is connected to an adjusting lever 60 having a hole 61 at its inner end and an offset handle portion 62 at its outward end. The lever is pivoted to the bracket 14 by means of a pivot pin 63 which engages an elongated hole 64 in the supporting bracket. Also formed in the supporting bracket, at its forward end, is an opening 65 having teeth 66 which define between them notches 67 selectively engageable by the portion 62 of the lever. The lever is biased horizontally into seated position by means of a spring 68.

To change the setting, the handle portion 62 of the lever is drawn forwardly for disengagement of the occupied notch, then swung either upwardly or downwardly and released into a new notch setting, where seating occurs by reason of the biasing spring 68. To maintain the housing level in all of its positions of adjustment, the same setting is used at each of the wheels. It is to be particularly noted that while adjustment of housing height changes the vertical spacing between the apron 40 and the tabs 51, 52, the latter are safe and effective for all positions of the housing. Indeed, the tabs 51, 52 may, if desired, be widened and merged into a continuous inwardly extending horizontal ledge 38b (FIG. 7) following the curvature of the housing and uniformly spaced with respect thereto, in which case the apron 40 may be omitted without substantial sacrifice of protection.

The invention has been described in connection with its missile shielding effect, but it will be understood that the side shield is equally effective in preventing the operator's foot from approaching the whirling blade even though the housing may be in its uppermost position creating a substantial gap between the lower edge of the housing and the ground. With ejection at the front and back of the mower adequately protected by the front and back aprons (FIG. 1), the present structure overcomes, simply and effectively, both of the main hazards associated with rotary mowers.

Although the invention has been described in connection with a side shield on the non-discharge side of the mower, it will be understood that a similarly mounted side shield may be employed on the discharge side, the only difference being that the latter will, necessarily, be scalloped out to provide clearance for the discharge chute and to prevent interference with discharge of the clippings, a matter well within the skill of the art. In most cases, however, it will not be necessary to employ a side shield on the discharge side because of the overhang of the chute structure and associated apron on that side. The shield, or shields, may be made of metal or other suitable material such as structural plastic with or without internal reinforcement.

What is claimed is:

1. In a rotary lawn mower, the combination comprising a housing having forwardly and rearwardly extending supporting brackets, front and rear ground wheels having axles, means for mounting the axles on the supporting brackets and having provision for vertical positioning adjustment thereby to control the riding height of the housing above the ground, and a side shield in the form of a vertical plate extending fore-and-aft alongside of the housing and adjacent the wheels, the plate being supported at its ends on the front and rear axles and extending close to the ground to prevent discharge of a missile at ground level, the plate having sufficient vertical height so that ejection of a missile above ground level is also prevented when the mower housing is riding in its high position.

2. The combination as claimed in claim 1 in which the plate has a straight central portion with a horizontal ledge extending along its top edge providing lateral reinforcement.

3. The combination as claimed in claim 1 in which lost motion is provided between the axle and the shield at at least one of the ends of the latter so that the wheels of the mower remain in contact with the ground when the side shield engages a minor irregularity on the ground.

4. The combination as claimed in claim 1 in which the side shield has a vertical slot for engaging one of the axles and a horizontal slot for engaging the other thereby to provide lost motion for the side shield in both the vertical and horizontal direction.

5. In a rotary lawn mower the combination comprising a housing having forwardly and rearwardly extending supporting brackets, front and rear ground wheels having axles, means for mounting the axles on the supporting brackets and having provision for vertical positioning adjustment thereby to control the riding height of the housing above the ground, a side shield in the form of a vertical plate extending fore-and-aft between the wheels, the plate being supported at its ends on the front and rear axles and extending close to the ground to prevent ejection of a missile at ground level, the housing having a laterally-extending horizontal apron along its lower edge and spanning at least a portion of the distance between the wheels, the apron having an outer edge which extends closely parallel to the side shield to prevent ejection of missiles above the side shield in all positions of relative adjustment of the housing.

6. In a rotary lawn mower the combination comprising a housing having forwardly and rearwardly extending supporting brackets, front and rear ground wheels having axles, means for mounting the axles on the supporting brackets and having provision for vertical positioning adjustment thereby to control the riding height of the housing above the ground, a side shield in the form of a vertical plate extending fore-and-aft between the wheels, the plate being supported at its ends on the front and rear axles and extending close to the ground to prevent discharge of a missile at ground level, the side shield having an inwardly projecting horizontal ledge along its upper edge extending into close proximity to the wheels and having a presented edge which follows the curvature of the housing, being substantially uniformly spaced with respect thereto to prevent ejection of missiles upwardly in the space adjacent the wheels.

7. In a rotary lawn mower the combination comprising a housing having forwardly and rearwardly extending supporting brackets, front and rear ground wheels having axles, means for mounting the axles on the supporting brackets and having provision for vertical positioning adjustment thereby to control the riding height of the housing above the ground, a side shield in the form of a vertical plate extending fore-and-aft between the wheels, the plate being supported at its ends on the front and rear axles and extending close to the ground to prevent ejection of a missile at ground level, the housing having a laterally extending horizontal apron along its lower edge and generally centered between the wheels, the apron having an outer edge which extends closely parallel to the side shield to prevent ejection of missiles above the side shield in all positions of relative adjustment of the housing, the side shield having a pair of inwardly extending tabs along its upper edge, the tabs being respectively positioned closely adjacent the wheel treads and in overlapping relation to the ends of the apron to prevent ejection of missiles upwardly adjacent the wheels.

* * * * *